(12) United States Patent
Chen et al.

(10) Patent No.: US 7,295,748 B2
(45) Date of Patent: Nov. 13, 2007

(54) VARIABLE OPTICAL ATTENUATOR WITH WAVELENGTH DEPENDENT LOSS COMPENSATION

(75) Inventors: Bo Chen, Shenzhen (CN); Xishe Liu, Shenzhen (CN); Yatao Yang, Plano, TX (US); Bo Cai, London (GB)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/462,503

(22) Filed: Aug. 4, 2006

(65) Prior Publication Data

US 2007/0031104 A1  Feb. 8, 2007

Related U.S. Application Data

(60) Provisional application No. 60/706,408, filed on Aug. 8, 2005.

(51) Int. Cl.
  *G02B 6/00* (2006.01)
(52) U.S. Cl. .................................. 385/140; 385/18
(58) Field of Classification Search ............. 385/18, 385/140; 359/872, 877
  See application file for complete search history.

(56) References Cited

U.S. PATENT DOCUMENTS

| | | | |
|---|---|---|---|
| 5,504,575 A * | 4/1996 | Stafford | 356/330 |
| 5,621,829 A * | 4/1997 | Ford | 385/22 |
| 6,002,818 A * | 12/1999 | Fatehi et al. | 385/17 |
| 6,353,692 B1 * | 3/2002 | Colbourne | 385/16 |
| 6,614,958 B1 * | 9/2003 | Schmidt | 385/33 |
| 6,628,856 B1 * | 9/2003 | Costello et al. | 385/18 |
| 6,694,073 B2 * | 2/2004 | Golub et al. | 385/18 |
| 6,760,501 B2 * | 7/2004 | Iyer et al. | 385/16 |
| 6,782,153 B2 * | 8/2004 | Polinsky et al. | 385/16 |
| 6,915,061 B2 | 7/2005 | Li et al. | 385/140 |
| 7,034,979 B1 | 4/2006 | Feng et al. | 359/246 |
| 2002/0061179 A1 | 5/2002 | Morimoto et al. | 385/140 |
| 2003/0174939 A1 * | 9/2003 | Moon et al. | 385/27 |
| 2004/0008967 A1 | 1/2004 | Chu et al. | 385/140 |
| 2004/0091229 A1 * | 5/2004 | Li et al. | 385/140 |
| 2004/0136680 A1 | 7/2004 | Medina et al. | 385/140 |
| 2004/0141681 A1 * | 7/2004 | Weverka et al. | 385/18 |

\* cited by examiner

*Primary Examiner*—Tina M. Wong
(74) *Attorney, Agent, or Firm*—Allen, Dyer, Doppelt, Milbrath & Gilchrist, P.A.

(57) ABSTRACT

The invention relates to compensating for the wavelength dependent loss (WDL) in a variable optical attenuator (VOA) system by using a chromatic dispersion wedge, which is inserted between the mirror and the lens. Different wavelength components, e.g. shorter blue and longer red wavelengths, are redirected at different angles by the chromatic dispersion wedge and now arrive at the output fiber at different positions. Thus the smaller mode field diameter (MFD) or mode spot size of the blue light, overlaps more of the core of the output fiber by being closer thereto and now has less insertion loss (IL) as compared to a VOA without WDL compensator.

12 Claims, 6 Drawing Sheets

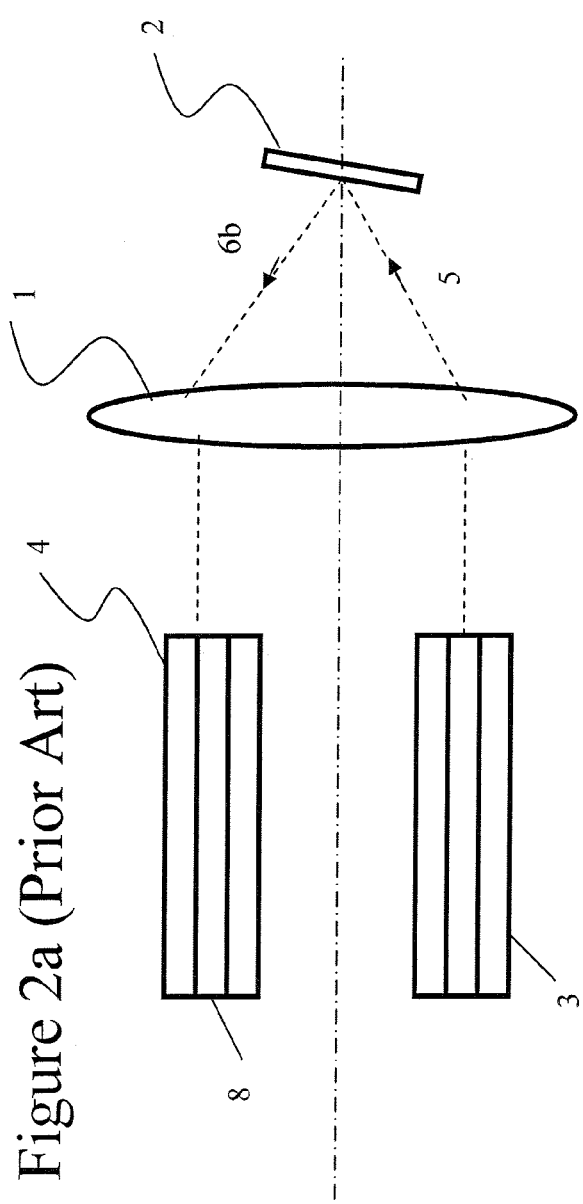
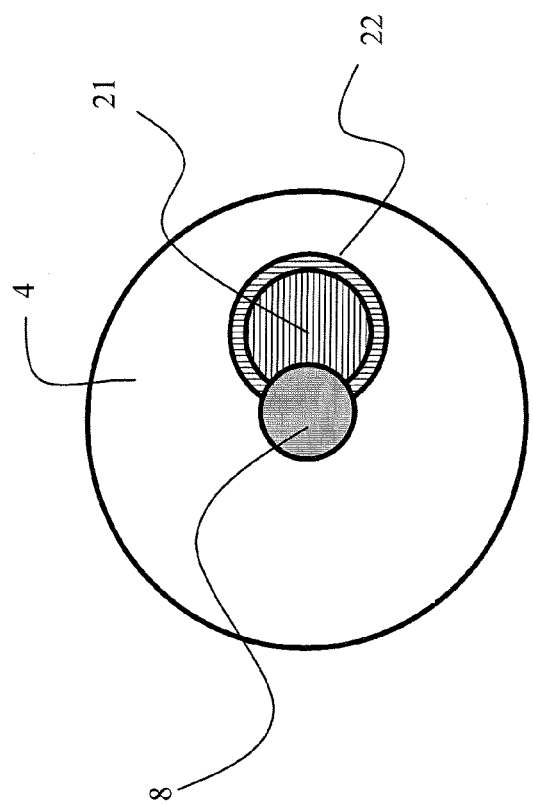
Figure 2a (Prior Art)
Figure 2b (Prior Art)

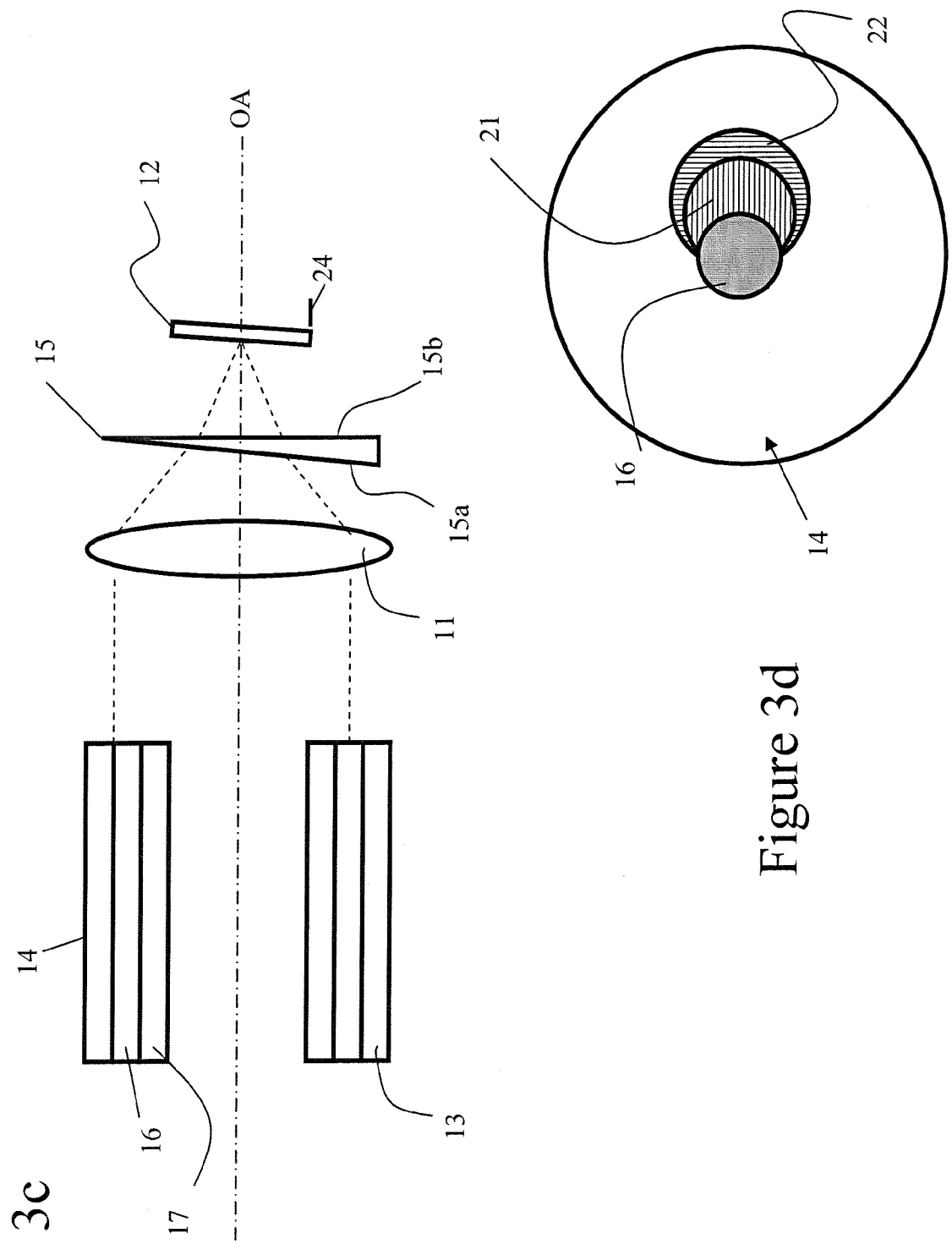

VARIABLE OPTICAL ATTENUATOR WITH WAVELENGTH DEPENDENT LOSS COMPENSATION

CROSS-REFERENCE TO RELATED APPLICATIONS

The present invention claims priority from U.S. Patent Application No. 60/706,408 filed Aug. 8, 2005, which is incorporated herein by reference.

TECHNICAL FIELD

The present invention relates to a tilting mirror based Variable Optical Attenuator (VOA) system having input and output optical waveguides that are used in optical communications systems and optical measurement systems, and in particular to a VOA, which includes wavelength dependent loss compensation.

BACKGROUND OF THE INVENTION

The basic configuration of a tilting mirror based VOA is shown schematically in FIG. 1a and comprises of a lens 1, a mirror 2, an input optical waveguide, e.g. input fiber 3, and an output optical waveguide, e.g. output fiber 4. Input light 5, including a plurality of wavelength components, e.g. red and blue wavelengths, from the input fiber 3 is collimated by the lens 1, and reflected by the mirror 2 forming a reflected beam 6a. The reflected beam 6a is then re-focused by the lens 1 into the output fiber 4. When the mirror 2 is set at an angle at which the reflected beam 6a is focused at the core 8 of the output fiber 4, i.e. an optimum position, the insertion loss (IL) of this coupling system is at a minimum (See FIGS. 1a and 1b). When the mirror 2 is tilted, as in FIGS. 2a and 2b, the reflected beam, identified by 6b, becomes off-set from the core 8 of the output fiber 4 causing an increase in IL, and therefore attenuation. The amount of IL, and therefore the amount of attenuation will be determined by the amount of off-set from the core 8, i.e. the tilt angle of the mirror 2 from the optimum position, shown in FIG. 1a. However, this configuration has an intrinsic loss called wavelength dependent loss (WDL) and is a function of attenuation and is related to differences in mode field diameters (MFD) of the different wavelength components. More specifically, the MFD or mode spot size of an optical fiber is a function of wavelength, and in an optical fiber, light with shorter wavelength components (blue light) is more tightly confined in the core of the optical fiber than light with longer wavelength components (red light), i.e. as illustrated in FIGS. 1b and 2b, the spot size for the blue light 21 is smaller than the spot size of the red light 22. The problem with the prior art VOAs, as illustrated in FIG. 2b, is that when the mirror 2 is tilted, the center of the reflected light beam 6b is off-set from the second fiber core 8 by the same amount for all wavelengths and the efficiency for coupling light into the output fiber 4 depends on the degree of overlap of the light spot size with the fiber core 8. For light beams having the same off-set, the shorter wavelength components have a smaller light spot size and will experience more coupling loss than the longer wavelength components that have the larger spot size because the larger spot size will simply over lap the core 8 more than the smaller spot size.

FIG. 1b illustrates a cross-sectional view of the output fiber 4 having a core 8 in which a blue light spot 21 and a red light spot 22 are concentric to the core 8 when the VOA is in the minimal attenuation state; and FIG. 2b illustrates a typical attenuation state with the non-concentric positions of the light spots, and with the blue light spot 21 overlapping the core at a smaller percentage than the red light spot 22 thereby causing greater IL loss for the blue light which is called wavelength dependant loss, WDL.

It's well known that IL can be expressed as the function of beam offset within the fiber and MFD (Mode Field Diameter) as shown in the following equation (1):

$$IL = 4.34 \cdot \left(\frac{x}{\omega}\right)^2 \quad (1)$$

Where x is the offset of the focused beam from core of the fiber, and $\omega$ is the half MFD. The $\omega$ in equation (1) is a function of wavelength $\lambda$, and it is in a linear relation with the wavelength when the wavelength is in a small range (e.g., C band or L band) and can be expressed by equation (2) below:

$$\omega = a + b \cdot \lambda \quad (2)$$

where a is a constant, and b is the linear chromatic dispersion coefficient. WDL can be then calculated using equation (3):

$$WDL = -2 \cdot b \cdot \frac{IL}{\omega} \cdot \Delta\lambda \quad (3)$$

For Corning SMF28 fiber, b is approximately equal to 3.11 in the C band and L band ranges. It is clear from (3) that when IL increases, WDL increases also, and a longer wavelength light, e.g. red light has less IL than a shorter wavelength light, e.g. blue light.

In the prior art there are a number of VOA systems that attempt to deal with WDL. One of these systems is disclosed in U.S. Patent Publication No. 2004/0008967, which tries to solve the problems of WDL and PDL (polarization dependent loss) by using a collimator comprised of various optical components including a ferrule holding at least two waveguides and a lens. The ferrule and the lens are selected such that the plane containing the end of the ferrule and the ends of the waveguides are not parallel to the facing end of the lens, so that it is possible to determine positions and axial orientations of the ferrule with respect to the lens which result in minimal WDL. However, there is no consideration given to MFD and the positional adjustment that could be used to offset WDL.

The VOA system disclosed in U.S. Pat. No. 6,915,061 utilizes a wedge that is placed between two lenses in order to help in focusing and reduce the size of the micromirror.

U.S. Pat. No. 6,782,153 discloses a device that has a filter, whereby the device performs two or more of the functions of wavelength division multiplexing or demultiplexing, attenuation, switching, filtering and tapping functions. The filter element preferably has a wedged cross-section in order to prevent an etalon caused by the two faces of the filter element, but there is no concern with reducing WDL.

U.S. Patent Publication No. 2004/0136680 discloses a VOA that has a semitransparent refractive mode shutter comprising a silicon shutter shaped as a wedge that provides variable tilt for an output beam, and therefore variable attenuation. Other parameters such as PDL, optical reflection losses (ORL) and WDL are also a function of the shutter geometry, but there is no concern for reducing WDL.

U.S. Patent Publication No. 2002/0061179 has a VOA employing shutters with a V-shaped notch that has a form adapted for reducing the dependency of optical attenuation rate on wavelength. The system shutters light so that the dependency of optical attenuation rate due to changes in mode field diameters caused by different wavelengths is reduced.

U.S. Pat. No. 7,034,979 discloses a VOA that uses a crystal wedge in polarization modulation wherein the crystal wedge is used to spatially recombine polarized beams, but there is no consideration of WDL.

SUMMARY OF THE INVENTION

An object of the present invention is to overcome the shortcomings of the prior art by compensating for intrinsic WDL of a tilting mirror based VOA by adjusting for differences in wavelength dependent MFD.

The present invention relates to a variable optical attenuator comprising:
  a first optical waveguide for launching an optical beam having first and second wavelength components, the first wavelength component having a shorter wavelength than the second wavelength component;
  a second optical waveguide for receiving the optical beam;
  a lens, having an optical axis, for collimating the optical beam from said first optical waveguide, and for focusing the optical beam onto said second optical waveguide;
  a tiltable mirror for receiving the optical beam from said lens and to reflect the optical beam back through said lens to the second optical waveguide, whereby different angular positions of the mirror result in different levels of attenuation, and result in an intrinsic wavelength dependent loss (WDL); and
  a chromatic dispersion wedge placed between said lens and said mirror, said wedge having a refractive index of n and a wedge angle α, set to deflect the first wavelength component by a different amount than the second wavelength component for at least partially compensating the intrinsic WDL.

BRIEF DESCRIPTION OF THE DRAWINGS

The invention will be described in greater detail with reference to the accompanying drawings which represent preferred embodiments thereof, wherein:

FIG. 1a is a schematic diagram of a conventional prior art tilting mirror VOA.

FIG. 1b is a cross-sectional view of the output fiber of the VOA of FIG. 1a.

FIG. 2a is a schematic diagram of a conventional prior art tilting mirror VOA in an attenuating position.

FIG. 2b is a cross-sectional view of the output fiber of the VOA of FIG. 2a.

FIG. 3b is a cross-sectional view of the output fiber of the VOA of FIG. 3a.

FIG. 3c illustrates the VOA of FIG. 3a in an attenuating position.

FIG. 3d is a cross-sectional view of the output fiber of the VOA of FIG. 3c.

DETAILED DESCRIPTION

Figures 1A, 1B:
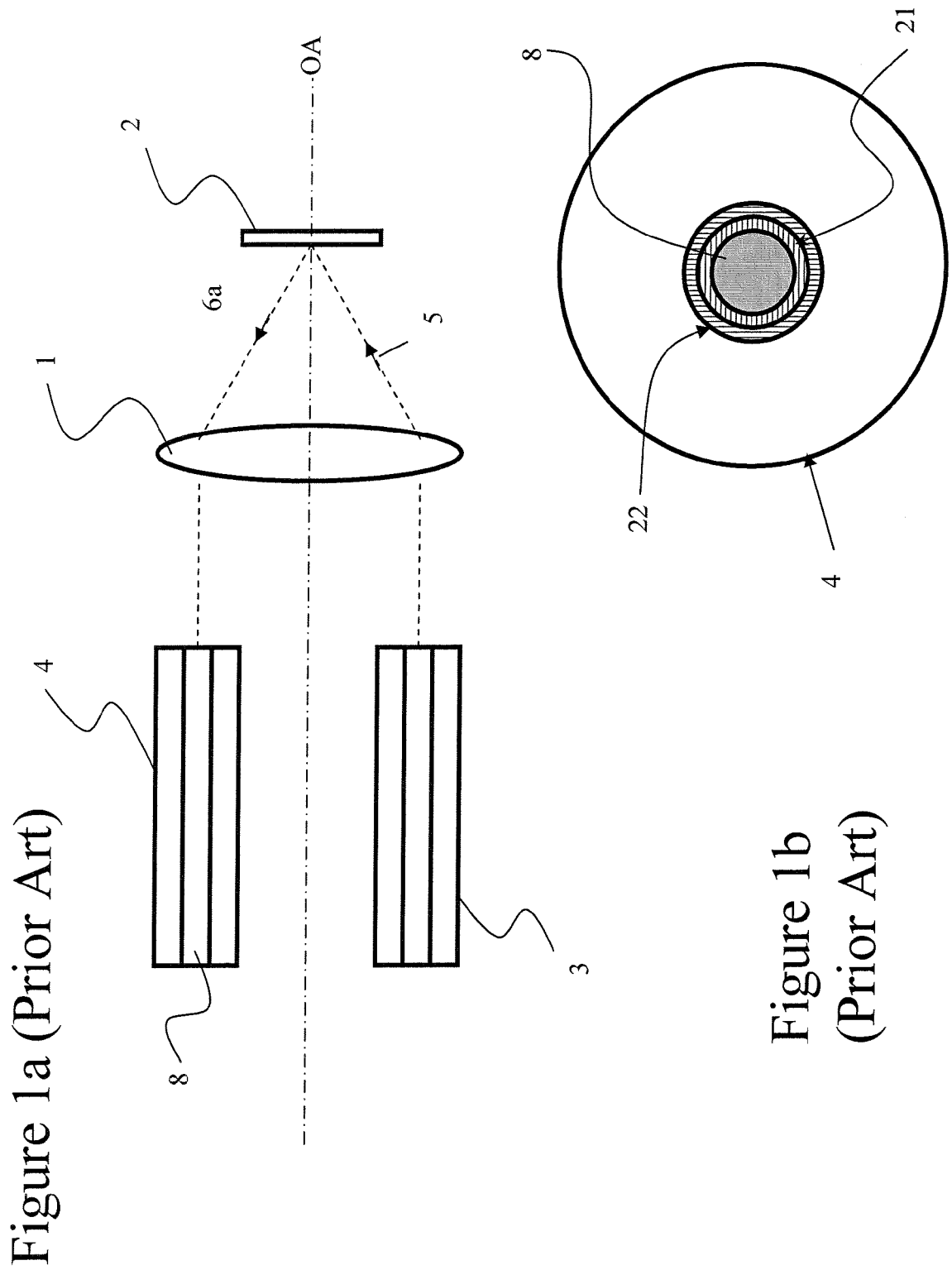
Figure 3A:
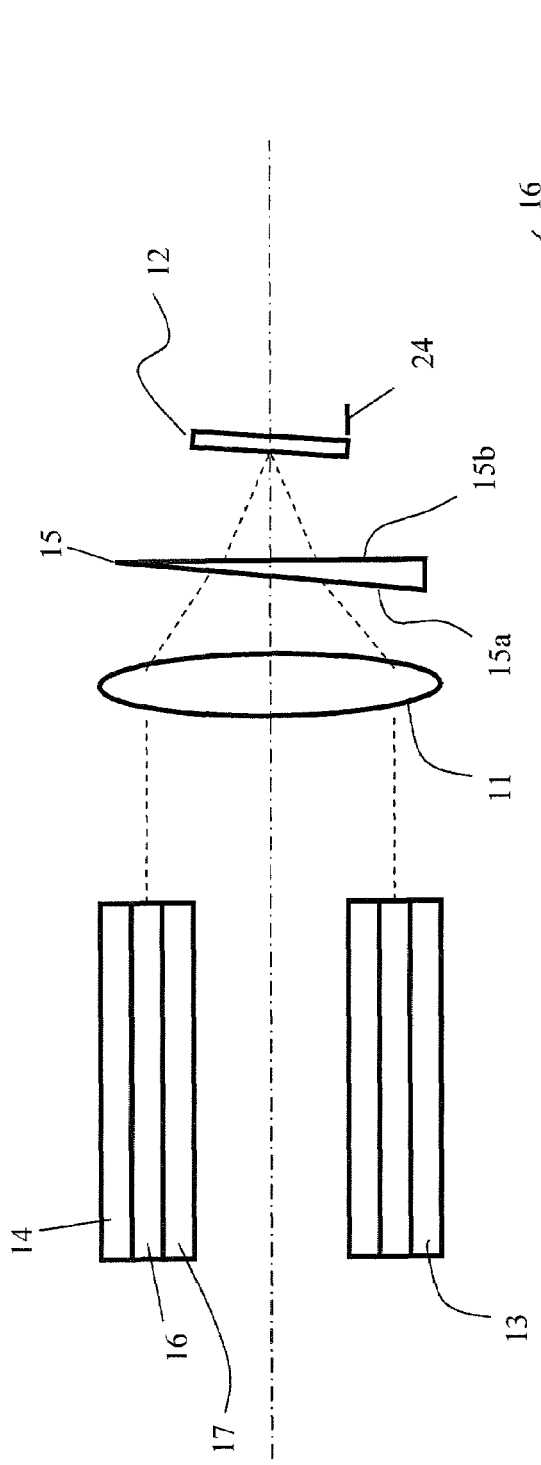
FIG. 3a illustrates a VOA according to the present invention with a compensating wedge.

A VOA according to the present invention, as illustrated in FIGS. 3a to 3d, includes an input fiber 13, a lens 11 with an optical axis OA, a tiltable mirror 12, and an output fiber 14 with core 16 and cladding 17. Ideally the input and output fibers 13 and 14, respectively, are positioned substantially equa-distant from the optical axis OA, so that the mirror 12 can be positioned perpendicular to the optical axis to provide near optimum coupling. In order to compensate for WDL in accordance with the present invention, a chromatic dispersion wedge 15 (WDL compensator) is inserted between the mirror 12 and the lens 11. An input beam of light including various wavelength components of light, e.g. red and blue light, is launched from the input fiber 13, and is collimated and directed by the lens 11 through the WDL compensator 15 to the tiltable mirror 12. The mirror 12 redirects the input beam of light back through the WDL compensator 15 and the lens 11 to the output fiber 14. FIGS. 3a and 3c show a VOA according to the present invention in the minimal and typical attenuation states, respectively.

Figure 3B:
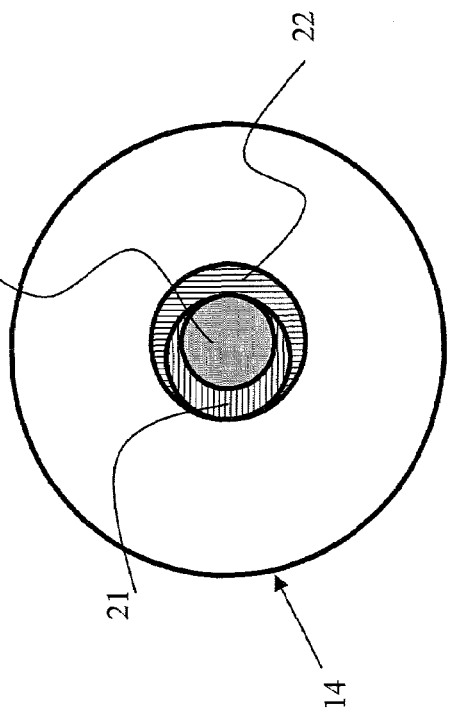

FIGS. 3b and 3d also show cross-sectional views of the output fiber 14 having core 16 with the effects on the blue and red light spots, 21 and 22, respectively, due to having the chromatic dispersion wedge or WDL compensator 15 inserted. Accordingly, the wedge 15 angularly separates the incident light by color, thereby causing the wavefronts of different wavelengths to deflect different angular amounts and become non-concentric. Accordingly, the centers, e.g. focus points, of a longer wavelength component, e.g. red light, and a shorter wavelength component, e.g. blue light, arrive at the core 16 of output fiber 14 at different positions. Specifically in FIG. 3a, the wedge 15 includes an input surface 15a and an output surface 15b, wherein the input surface 15a is at an acute angle, i.e. a wedge angle α, from the output surface 15b. The wedge angle α is set such that the input face 15a faces the tilted mirror 12, i.e. the pivoting axis of the tilting mirror 12 is perpendicular to the input face 15a and the wedge angle α, in such a way that, as illustrated in FIG. 3d, the center of the shorter wavelength component, e.g. the blue light spot 21, is focused by lens 11 closer to the core 16 of the output fiber 14 than the center of the longer wavelength component, e.g. red light spot 22. Thus the shorter wavelength component, e.g. the blue light, now has a higher percentage of overlap of the core 16 than in FIG. 2b and therefore has less IL due to wavelength than before and is in opposition to the effect of intrinsic WDL. Accordingly, the smaller MFD of the shorter wavelength component, e.g. the blue light, is shifted more towards the core 16 compared to the larger MFD of the longer wavelength component, e.g. the red light, thereby at least partially compensating the intrinsic WDL.

Figure 4:
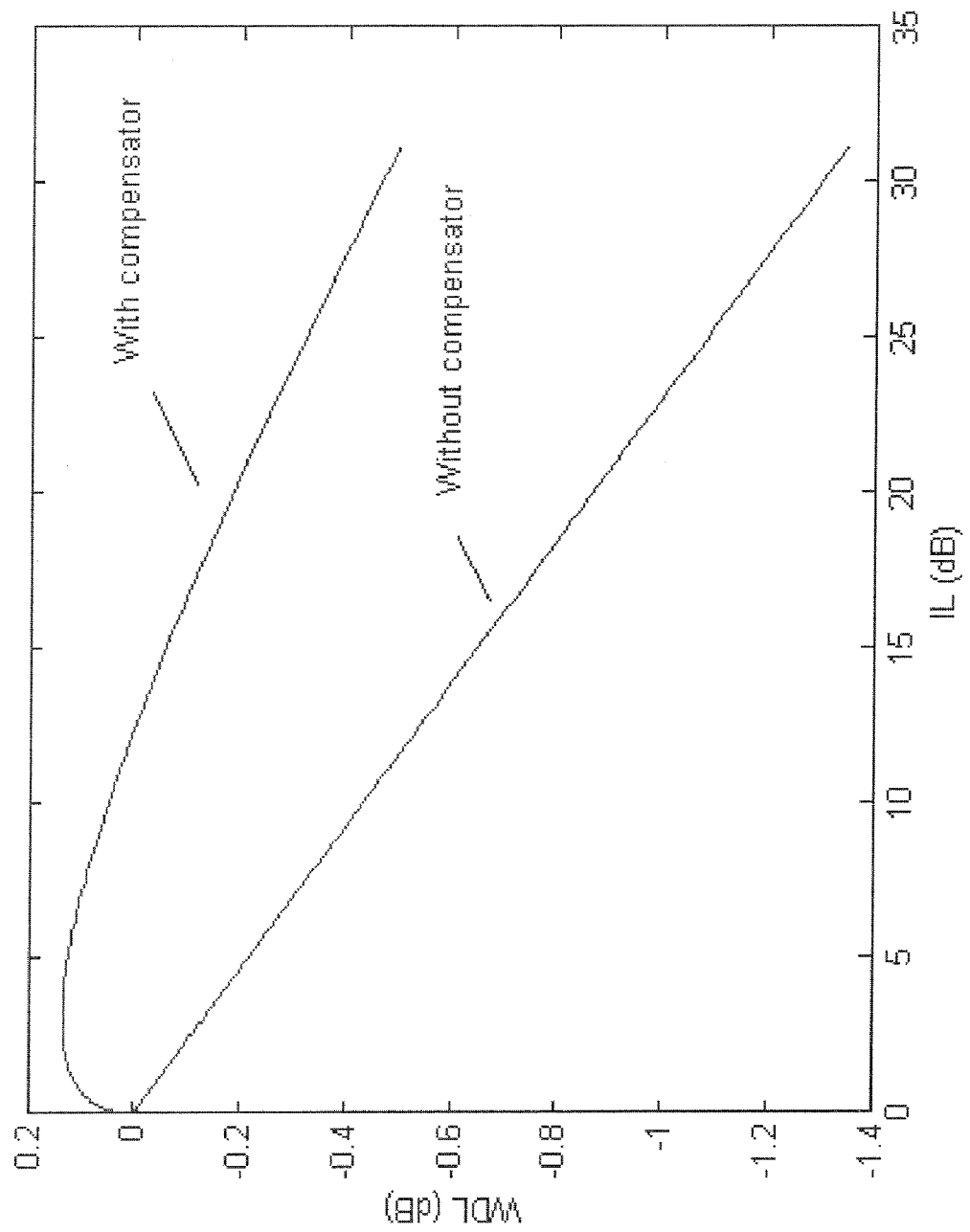
FIG. 4 is a graph of IL vs. WDL showing the WDL with and without the compensating wedge.

In general, the residual WDL, $(WDL)_r$ with chromatic dispersion wedge 15 inserted in, is given as:

$$(WDL)_r = 2 \cdot IL \cdot \left(\frac{p}{x} - \frac{b}{\omega}\right) \cdot \Delta\lambda \qquad (4)$$

where p is a material dispersion related parameter defined by:

$$p = 2\alpha \cdot f \cdot \frac{\Delta n}{\Delta \lambda} \quad (5)$$

where α is the wedge angle, f is the focal length of the lens 11, n is the refractive index of the wedge 15. Although WDL can not reach zero for all IL, it can be very small for a large range of attenuations (e.g., 0~20 dB) when the wedge angle α is properly selected. FIG. 4 shows the WDL of an embodiment of the present invention with the wedge compensator 15 having a 5° wedge angle. In FIG. 4, WDL without compensation is also shown for comparison, and it is to be seen that the compensating effect of a chromatic dispersion wedge 15 is significant.

Figure 3E:
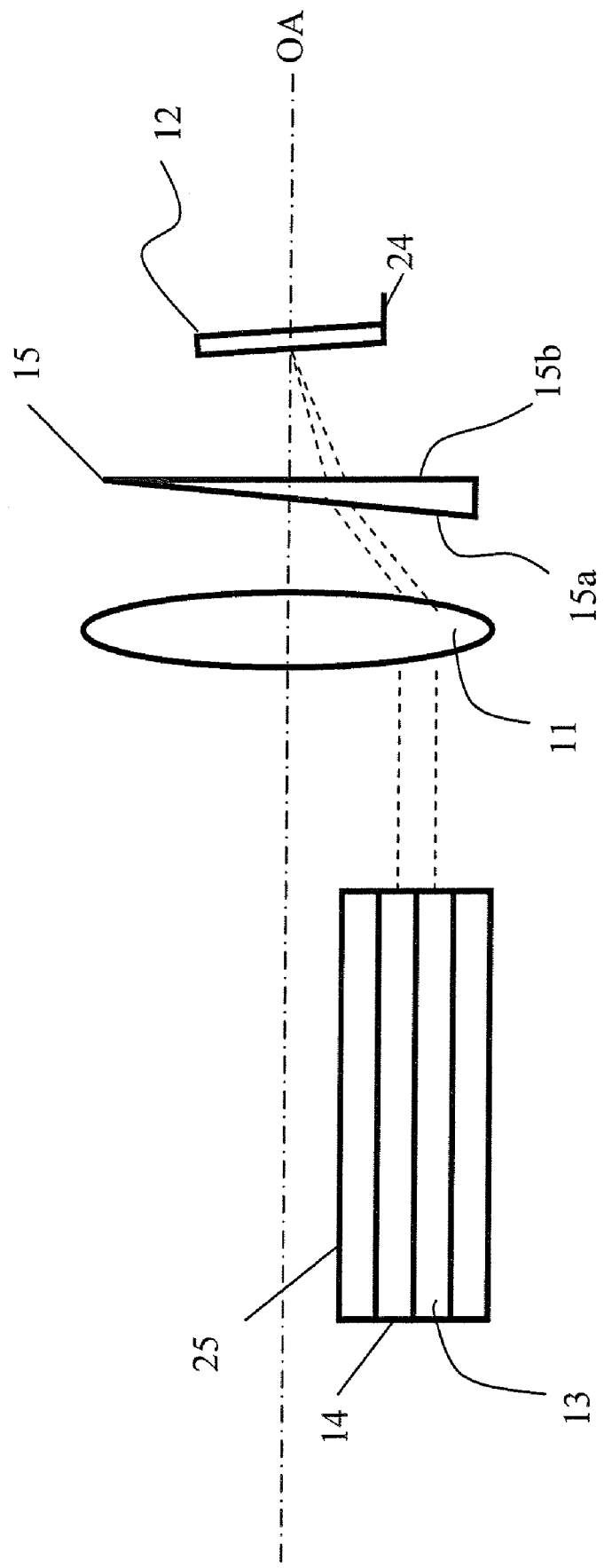
FIG. 3e illustrates another embodiment of the present invention.

In a preferred embodiment, the wedge 15 comprises a "thin prism", e.g. with a wedge angle α between 0° and 10°, so that the angle of deviation of the light traveling through the wedge 15 can be simply defined as (n−1) α, assuming that the index of the medium, e.g. air, surrounding the prism is 1, and that the wedge angle and the deviation angle are small enough so that the sine of the angles is approximately the same as the angles themselves. Ideally, the tilt of the mirror 12 is controlled by any suitable MEMS actuator 24 mounted on a MEMS chip, as is well known in the art. If the MEMS chip is preset substantially at an angle of (n−1) α to the optical axis OA of the lens 11, as in FIG. 3e, the input beam of light will impact the mirror 12 at normal incidence when the mirror 12 is parallel to the MEMS chip, i.e. not actuated. Accordingly, with an additional minor alignment of the MEMS chip, a double bore pigtail 25 can be used on one side of the optical axis OA to house the input and output fibers 13 and 14, whereby the output fiber 14 has minimal insertion loss when the mirror 12 is in a rest or inactivated position, e.g. parallel to the MEMS chip.

Another mode for the variable optical attenuator, according to the present invention, is to have front and rear surfaces 15a and 15b of the chromatic dispersion wedge 15, shown in FIGS. 3a and 3c coated with an anti-reflection (AR) coating. Furthermore, the chromatic dispersion wedge 15 is tilted with a small acute angle, e.g. 1° to 5°, whereby the front and rear surfaces 15a and 15b are not perpendicular to the optical beam, such that the residual reflection from the two AR-coated surfaces 15a and 15b of the chromatic dispersion wedge 15 does not couple into said input and output optical waveguide 13 and 14.

We claim:

1. A variable optical attenuator comprising:
   a first optical waveguide for launching an optical beam having first and second wavelength components, the first wavelength component having a shorter wavelength than the second wavelength component;
   a second optical waveguide for receiving the optical beam; a lens, having an optical axis, for collimating the optical beam from said first optical waveguide, and for focusing the optical beam onto said second optical waveguide;
   a tiltable mirror for receiving the optical beam from said lens and to reflect the optical beam back through said lens to the second optical waveguide, whereby different angular positions of the tiltable mirror result in different levels of attenuation, and result in an intrinsic wavelength dependent loss (WDL) in which the first and second wavelength components are not subject to the same levels of attenuation at the different angular positions; and
   a chromatic dispersion wedge placed between said lens and said tiltable mirror, said wedge having a refractive index of n and a wedge angle α, set to deflect the first wavelength component by a different amount than the second wavelength component for compensating the intrinsic WDL, whereby the first and second wavelength components are subject to substantially the same levels of attenuation at each angular position over a range of attenuations from 0 dB to 20 dB.

2. The variable optical attenuator according to claim 1, further comprising a MEMS actuator on a MEMS chip to tilt said tiltable mirror.

3. The variable optical attenuator according to claim 1, wherein an input face of said chromatic dispersion wedge is perpendicular to a pivot axis of said tiltable mirror.

4. The variable optical attenuator according to claim 2, further comprising a double bore pigtail for holding the first and second waveguides; wherein said MEMS chip is preset with an angle of substantially (n−1) α to the optical axis of said lens, whereby the optical beam is reflected from the first waveguide to the second waveguide when the tiltable mirror is inactive.

5. The variable optical attenuator according to claim 1, wherein the second optical waveguide includes a core, and wherein the chromatic dispersion wedge separates the first and second wavelength components such that a center of a focus point of the first wavelength component is closer to a center of the core of said second optical waveguide than a center of a focus point of the second wavelength component in order to compensate the intrinsic WDL.

6. The variable optical attenuator according to claim 1, wherein the second optical waveguide includes a core, wherein the chromatic dispersion wedge shifts the shorter wavelength component relative to the longer wavelength component such that a center or a focused spot of the shorter wavelength component is closer to a center of the core of said second optical waveguide than a center of a focused spot of the longer wavelength component in order to compensate the intrinsic WDL.

7. The variable optical attenuator according to claim 1, wherein the second optical waveguide includes a core, wherein the first wavelength component has a mode field diameter (MFD) that is smaller than a MFD of the second wavelength component, and wherein the chromatic dispersion wedge redirects the first and second wavelength components at different angles such that a center of the wavelength component with the smaller MFD is shifted more towards a center of the core of said second optical waveguide than a center of the wavelength component with the larger MFD in order to compensate the intrinsic WDL.

8. The variable optical attenuator according to claim 1, wherein the chromatic dispersion wedge includes an front surface and an rear surface both with an AR coating; and wherein the chromatic dispersion wedge is tilted with respect to the optical beam, such that residual reflection from the front and rear AR-coated surfaces of the chromatic dispersion wedge do not couple into said first and second optical wave guides.

9. The variable optical attenuator according to claim 1, wherein the wedge angle is between 0° and 10°.

10. The variable optical attenuator according to claim 1, wherein the wedge angle is about 5°.

11. The variable optical attenuator according to claim 8, wherein the wedge is tilted between 1° and 5°.

12. The variable optical attenuator according to claim 1, wherein the wedge angle is between about 5° and about 10°.

* * * * *